Patented May 25, 1948

2,442,131

UNITED STATES PATENT OFFICE 2,442,131

DEHYDROGENATION CATALYSTS

Kenneth K. Kearby, Cranford, N. J., assignor to Standard Oil Development Company, a corporation of Delaware No Drawing. Original application March 13, 1943, Serial No. 479,144, now Patent No. 2,418,889, dated April 15, 1947. Divided and this application October 22, 1946, Serial No. 704,989

4 Claims. (Cl. 252—231.5)

This is a division of my copending application Serial No. 479,144, filed March 13, 1943, now Patent No. 2,418,889, which is in turn a continuation-in-part of my copending application Serial No. 456,267, entitled "Dehydrogenation of hydrocarbons and catalysts therefor," filed August 26, 1942, now Patent No. 2,370,798.

This application contains a disclosure similar to that contained in the application of Kenneth K. Kearby, filed February 14, 1942, and assigned Serial No. 430,873, now Patent No. 2,395,875.

My present invention relates to catalytic dehydrogenation of hydrocarbons, and more particularly, it relates to improved catalysts for dehydrogenating olefins and aralkyl hydrocarbons, and to methods for preparing the said catalysts.

My present invention is particularly adapted to the dehydrogenation of low molecular weight olefin hydrocarbons having from 2 to 10, preferably 2 to 6, carbon atoms, but is also applicable to dehydrogenation of aralykyl hydrocarbons, such as ethyl and propyl benzene to form styrene and phenyl-methyl-ethylenes and to convert isopropyl benzene to methyl styrene.

Recently, processes designed to convert butene to butadiene have become of increased importance due to the fact that butadiene is an essential intermediate in one of the more important methods for the production of synthetic rubber-like materials.

In the production of diolefins from olefins by the catalytic dehydrogenation of mono-olefins, it is, of course, desirable to obtain as high a yield of the diolefin as possible per one passage of the butene thru the dehydrogenation zone, and as a corollary to this purpose, it is also a desideratum to this type of process to obtain as small an amount as possible of by-products. It is also desirable to conduct the dehydrogenation under such conditions that the fouling of the catalyst is minimized to as great an extent as possible. The efficiency of the catalyst is best measured in terms of per cent selectivity, which means the per cent of the total amount of initial material which undergoes conversion which is converted to the desired product. For example, if 50% of the initial material undergoes conversion of some sort, and 30% of the initial material is converted to the desired product, then the selectivity would be 60.

I have now discovered a new type of catalyst which when used under certain conditions in the dehydrogenation of hydrocarbons makes it possible to obtain substantially greater yields of the desired dehydrogenation product than can be obtained by the use of previously known catalysts. The nature of this new type of catalyst and the conditions under which it is used will be fully understood from the following description.

In the above referred to Kearby application, there is disclosed a dehydrogenation catalyst which comprises magnesium oxide as a base material, iron oxide as an active ingredient, and a small amount of a promoter which consists of an alkali or an alkaline earth oxide. In addition, the catalyst may contain a small amount of a stabilizer which stabilizer may consist of an oxide of a metal of the right-hand side (transition series) of groups I, II, and III of the periodic system or certain non-acidic oxides.

As pointed out in the aforesaid prior Kearby application, the principal function of the promoter in these catalysts is to increase the dehydrogenating activity of the catalyst. The principal function of the stabilizer, when used, is to prevent the promoter from volatilizing or becoming inactive.

In my present application I propose to use as a base beryllium oxide, and this material should constitute the major portion of the entire catalyst composition. The following table gives the range of each component which may be used:

| Component: | Parts by weight |
|---|---|
| BeO | 50–97 |
| $Fe_2O_3$ | 3–50 |
| Promoter | 3–15 |
| Stabilizer | 1–15 |

Among the alkali metal and alkaline earth oxides which may be used as promoters are the oxides of calcium, strontium and sodium, but potassium oxide is greatly superior.

However, I wish to point out that some of the desired conversion is obtained by omitting the promoter and the stabilizer and compounding the catalyst only from the base and the active ingredients.

The following stabilizing oxides give good results: Oxides of metals of the right-hand side (transition series) of groups I, II, and III of the periodic system, particularly oxides of copper and silver; non-acidic transition oxides of chromium, manganese, cobalt and nickel; and non-acidic oxides of zirconium, cerium, lead, bismuth, and particularly $Al_2O_3$ and $ThO_2$.

In place of the iron oxide in the above type of catalyst, oxides of chromium and manganese also form good catalysts. Nickel and cobalt oxides give less selective catalysts. Effective catalysts are obtained with all of these active ingredients but oxides of iron and chromium are preferred.

The activity of the catalyst can be improved by including a fifth component, viz., 1% by weight of silica gel, i. e., 99% of the 4 components mentioned above and 1% of silica gel.

One particularly effective catalyst of the above type, including the promoter and the stabilizer, has the following composition:

| Component: | Parts by weight |
|---|---|
| BeO | 80 |
| Fe$_2$O$_3$ | 20 |
| K$_2$O | 5 |
| CuO | 5 |

The above catalyst may conveniently be prepared as follows:

*Example*

80 BeO—20 Fe$_2$O$_3$—5 CuO—5 K$_2$O

A solution of 209 grams of ferric nitrate and 36.5 grams of copper nitrate in 1 liter of H$_2$O was stirred into a suspension of 355 grams of hydrated beryllium oxide (47.7% loss on ignition) in 2 liters of water. A solution of 170 grams of K$_2$CO$_3$ in 200 cc. of water was added and the mixture stirred for 1 hour at 80–90° C. The precipitate was filtered, thoroughly washed, and mixed with a solution of 18.8 grams of K$_2$CO$_3$ in 200 cc. of H$_2$O. The wet mixture was dried, heated for 3 hours at 1200° F., and pilled.

The above catalysts possess a high degree of selectivity to the dehydrogenation of normal butene to butadiene, the selectivity being of the order of 70–85%.

In order to set forth the utility of my invention, the following description of a test in which butene-1 was dehydrogenated to form butadiene when employing a beryllium oxide as base catalyst is set forth below:

A mixture of normal butenes (containing 95% of butene-2) was passed for one hour at a rate of 800 volumes (normal temperature and pressure) per volume of catalyst per hour, with 5600 volumes of steam over the catalyst whose preparation was described in the above example, at a temperature of 1200° F. The amount of butene converted to butadiene was 29.2%, with a total conversion of 39% and a selectivity of 75%.

At lower conversions of about 25–30%, selectivities of 80% can be obtained when the lower conversion is obtained by reducing the temperature or increasing the through-put.

In carrying out the process using catalysts of the type above described, the hydrocarbon, preferably with steam, is passed over the catalyst at a rate between 50 and 5000, preferably between 100 and 1000 volumes (measured at normal temperature and pressure) of hydrocarbon per volume of catalyst per hour. The ratio of steam to hydrocarbon is between 30:1 and 1:1, preferably from 8:1 to 4:1. The reaction chamber is maintained at a temperature between 1000 and 1600° F., preferably between 1100 and 1300° F. and under atmospheric, below atmospheric or above atmospheric pressure. The hydrocarbon which passes through the reaction zone unaffected may of course be recycled thereto.

The principal function of the steam is to dilute the hydrocarbon and thus reduce the partial pressure thereof in the reaction zone. At the same time, however, the steam performs another useful function in that it reacts with coke which may be deposited on the catalyst to form carbon oxides and hydrogen. The elimination of at least a portion of the coke in this manner tends to prolong the time the catalyst can be used before it requires regeneration. Thus the reaction portion of a complete cycle of reaction and regeneration may be as long as 15, 25 or 50 hours or more although it is usually preferable in operation to run for periods of ½ hour to 10 hours and then regenerate.

Regeneration of the catalyst may be effected by shutting off the flow of hydrocarbon and passing steam, air, or a mixture of steam and air through the catalyst mass while it is maintained at a temperature between 1100° F. and 1300° F. Following substantially complete removal of coke from the catalyst in this manner, the flow of hydrocarbon and steam may be resumed.

My present invention may be carried out either in the stationary bed type of operation or a fluid catalyst type of operation. In the former, the catalyst is contained in a case or reactor and the mixture of steam and hydrocarbon is simply forced through the material, preferably being discharged into the top, forced through the catalyst, and withdrawn from the bottom. The catalyst is preferably in the form of pellets, pills, granules, and the like. In the fluid catalyst type of operation, the catalyst is in the form of a powder having a particle size of from 100 to 400 mesh and is discharged into the reaction zone from a standpipe together with the hydrocarbon to be dehydrogenated, and steam, the catalyst and vapors entering preferably at a point at the bottom of the reactor and passing upwardly through a grid and forming within the reactor a dense phase suspension, that is to say, a suspension of catalyst in the gases of a concentration such that each cubic foot contains from 2 to 35 or more pounds of catalyst. This dense phase may be formed within the reaction zone above the grid by controlling the linear velocity of gases or vapors by regulating them within the range of say ½ to 8 to 10 ft./sec. Continuity of operation may be thus obtained and the catalyst may be withdrawn through a bottom draw-off pipe regenerated, if necessary, and returned preferably substantially uncooled through the aforementioned standpipe to the reactor. The precise details, however, of operating the reactor do not form an important aspect of my present invention and any known reactor adapted to provide good contact between the solid and gas may be employed.

To recapitulate, my present invention relates to improvements of dehydrogenation catalysts, to the methods of preparing such catalysts, and is characterized briefly by the fact that I employ a beryllium oxide base in addition to iron oxide, and, usually an oxide of iron, chromium, manganese, cobalt or nickel, a small amount of a promoter and/or a stabilizer. An outstanding advantage of my invention is that I may carry out the dehydrogenation of a hydrocarbon in the presence of large quantities of steam without injuring the catalyst and thus I may greatly extend the life of catalysts since the presence of steam tends to retard the deposition of hydrocarbon contaminants upon the catalyst. Also, the presence of steam makes it possible to supply the heat necessary for this highly endothermic reaction by the superheating of the said steam at least in substantial part and also makes it possible, particularly with the stationary bed type of operation, to control the contact time since dilution with steam of the entering reactant makes it possible to vary the reaction time virtually to any desired value regardless of how small that contact time interval may be.

I claim:

1. A catalyst composition adapted to catalyze the dehydrogenation of mono-olefins and alkylated aromatics having at least 2 carbon atoms in a side chain which consists essentially of 50 to 97 parts by weight of beryllium oxide, 3 to 50 parts by weight of iron oxide, 3 to 15 parts by weight of an alkali forming potassium compound, and 1 to 15 parts by weight of a metal oxide from the group consisting of copper oxide and silver oxide.

2. The catalyst composition specified in claim 1, in which the potassium compound is potassium carbonate.

3. A catalyst adapted to dehydrogenate mono-olefins and alkylated aromatics having at least 2 carbon atoms in the side chain which consists essentially of 50 to 97 parts by weight of beryllium oxide, 3 to 50 parts by weight of iron oxide, 3 to 15 parts by weight of potassium oxide, and 1 to 15 parts by weight of copper oxide.

4. A catalyst adapted to dehydrogenate mono-olefins and alkylated aromatics having at least 2 carbon atoms in the side chain which consists essentially of 80 parts by weight of beryllium oxide, 20 parts by weight of iron oxide, 5 parts by weight of potassium oxide and 5 parts by weight of copper oxide.

KENNETH K. KEARBY.